May 26, 1936.　　　F. L. HITCHCOCK　　　2,041,833
FUEL SUPPLY AND CONTROL SYSTEM
Filed May 14, 1932　　　5 Sheets-Sheet 4

INVENTOR.
FORREST L. HITCHCOCK.
BY Lockwood Lockwood
Goldsmith & Galt
ATTORNEYS.

May 26, 1936.  F. L. HITCHCOCK  2,041,833

FUEL SUPPLY AND CONTROL SYSTEM

Filed May 14, 1932  5 Sheets-Sheet 5

INVENTOR.
FORREST L. HITCHCOCK.

BY Lockwood Lockwood Goldsmith & Galt.

ATTORNEYS.

Patented May 26, 1936

2,041,833

UNITED STATES PATENT OFFICE 2,041,833

FUEL SUPPLY AND CONTROL SYSTEM

Forrest L. Hitchcock, Indianapolis, Ind.

Application May 14, 1932, Serial No. 611,285

11 Claims. (Cl. 236—9)

This invention relates to an automatically controlled heating system.

The chief object of this invention is to automatically regulate the supply of fuel for combustion required for heating and also contemplates the automatic regulation of the fuel supply dependent upon the condition of the fire at the time that heat is required.

Another object of the invention is to include in such a system, a furnace having an automatic control for insuring a predetermined draft through the fire, such draft being specifically of the natural draft type.

Another object of the invention is to provide a solid fuel feeding mechanism of the automatic stoker type wherein the fuel is supplied to the furnace as and when required, and the ash therefrom is automatically removed in the operation of the fuel feeding mechanism.

The chief feature of the invention consists in the accomplishment of the foregoing objects.

An additional feature consists in the thermostatic regulation of the amount of fuel supplied determinable by the fire condition, in turn, determinable by the temperature of the flue gases.

Other features of the invention will appear more fully hereinafter from the detailed description of the various parts.

The full nature of the invention will be more clearly understood from the accompanying drawings and the following description and claims:

Figure 1:
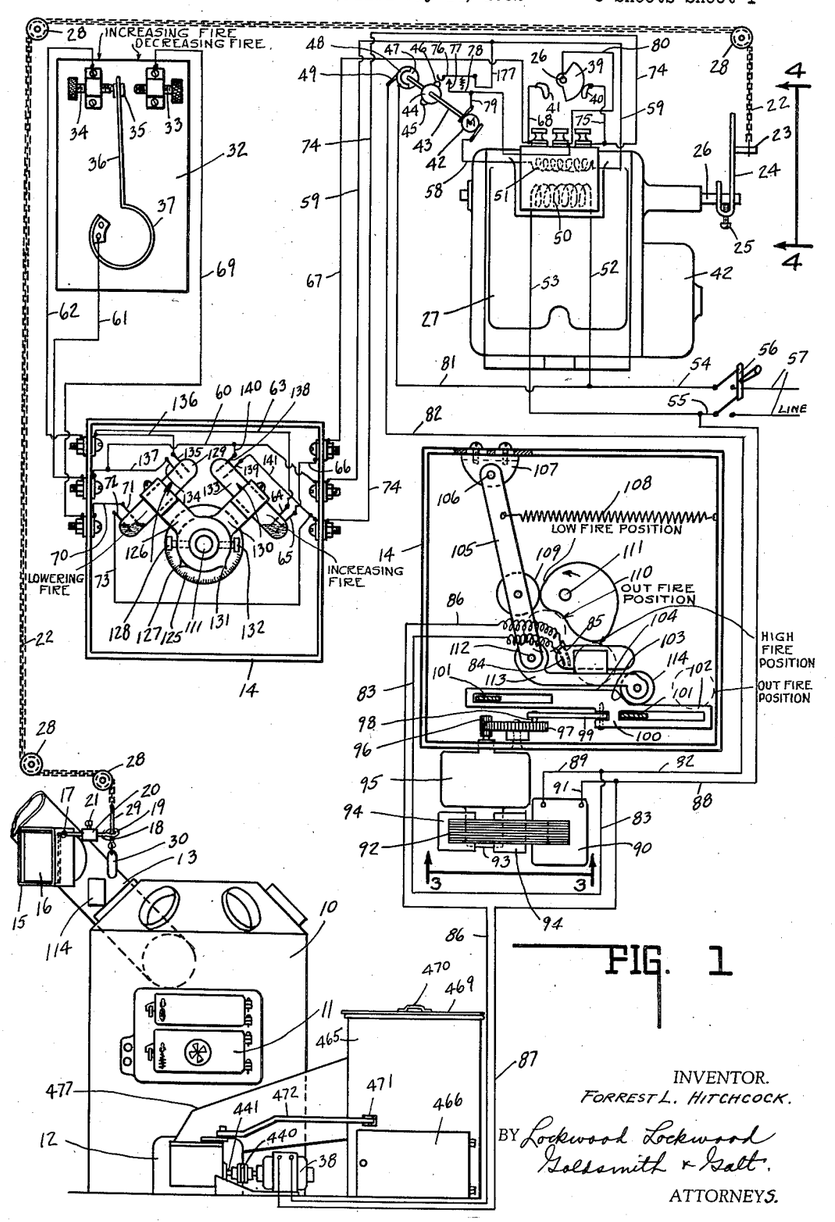
Fig. 1 is a complete diagrammatic layout of the system including a furnace equipped with a motor operable fuel feeding device.

In Fig. 1 of the drawings, there is illustrated a furnace 10 of the hot air type having the usual fire door 11 and the ash door frame 12, the ash door being omitted therefrom. The furnace 10 includes the smoke pipe 13 and mounted thereon is the main switch box 14. The pipe 13 has an auxiliary inlet 15 and mounted therein is a vane or valve 16, the same being carried by the rock shaft 17. An arm 18 terminates in an eye 19. The arm supports a valve counterbalancing weight 20 that is adjustably mounted as at 21 thereon. When valve 16 is entirely closed, the normal and full natural draft is secured through the ash door opening, through the fire, and thence through the smoke pipe and out the chimney. If the draft, by reason of relatively low outside temperatures, or by reason of high winds, is increased, then the valve 16 is automatically tilted by the suction in smoke pipe 13 and air is by-passed into the smoke pipe which maintains a substantially uniform natural draft through the fire. The cable 22 is connected at one end to an adjustable arm 23 carried by the arm 24 detachably mounted as at 25 upon shaft 26 of the control motor mechanism 27. Guide pulleys 28 are associated with the cable. The other end of the cable terminates in a rod 29 that slides through the eye 19 of the arm 18 and carries upon its end a weight 30 which serves to maintain the cable taut at all times.

Whenever the fire is to be checked, the arm 24 is positioned so that the rod 29 is elevated, rocking the shaft 17 so that the valve or plate 16 is tilted into the open position, thereby accomplishing the same effect as if the check damper on the usual furnace construction were open.

Positioned at any suitable location in the house to be heated by the furnace, is a thermostat construction 32 which has two adjustable contacts 33 and 34 adapted for selective engagement by the contact 35 carried by the finger 36 of a coil thermostat 37, or an equivalent thermostatic control.

When the temperature in the house or room in which the thermostat is mounted, falls to that for which the contact 34 is set, a circuit is completed from contact 34 through the thermostat 37 or equivalent arrangement, and current is supplied, in the absence of any other intervening conditions, to energize the fuel feeding motor 38. Whenever the temperature in the house or room in which the thermostat is mounted, increases, the thermostat expands and the member 36 moves to the right (see Fig. 1) so that contact 35 engages contact 33, which energizes the motor control mechanism to open the circuit to the fuel feeding motor 38, thereby stopping any further fuel supply and opens the check damper.

For normal operation, it is assumed that the fire is in proper condition to receive fuel.

The control motor mechanism 27 is conventionally illustrated in the upper right hand portion of Fig. 1. The shaft 26 mounts a cam contact member 39 which is adapted to alternately engage contacts 40 and 41. The control includes a conventional motor 42 and a shaft 43 rotatable thereby operates a switch actuating member 44 having the elevated portions 45 and 46. The shaft 43 also operates a switch member 47 having the semi-circular contact 48. Associated with semi-circular contact 48 is a brush 49. The control motor mechanism includes a transformer primary 50 and a secondary 51. The primary 50 is connected by lines 52 and 53 to the main lines 54 and 55. A master switch 56 is arranged to close the circuit from supply lines 57. When main switch 56 is closed, the primary 50 is energized and the secondary 51 of the transformer is also energized when the secondary including circuit is closed. The shaft 43 is operatively connected to the shaft 26 for equal speed of rotation. Line 58 connects one terminal of motor 42 to one terminal of the secondary. Line 59 connects the other terminal of the secondary 51 to thermostat 32 by means of the jumper 60 and the line 61 to coil 37 thereof. The contact 34 of the thermostat is connected to line 62 and by a jumper 63 to a terminal 64 of a mercury switch 133. The other terminal 65 thereof is connected by line 66 to a line 67, in turn, connected to line 68 connected to contact 41.

Contact 33 is connected by line 69 to line 70, in turn, connected to one terminal 71 of another mercury switch 129, the other terminal 72 of which is connected by line 73 to a line 74, in turn, connected by line 75 to the other contact 40. Mercury switches 133 and 129 for normal fire conditions, are normally closed as shown in the middle left hand portion of Fig. 1. When the thermostat closes the circuit through the contacts 34 and 35, the control motor circuit through the secondary is closed and the control motor 42 begins to turn. Upon its initial movement, the engagement of the arcuate switch member 39 with the adjacent contact 40 or 41 is broken but this action occurs subsequent to the dropping of the switch member 76 upon the relieved portion of the cam switch 44—45—46 so that the switch member 76 connected by line 177 to one terminal of the secondary engages the contact 77 and a line 78 therefrom maintains the control motor circuit through the line 79. The initial motor circuit is completed by the line 80 connected to contact 39 at one end and to the junction of lines 78 and 79 at the other end.

In other words, the motor circuit is initially made by the thermostat through the switch 39—41 or 40 and then maintained through the switch 76—77 and continued rotation of the control motor shaft 43 maintains the motor circuit but breaks the initiating circuit and the contact member 39 rotating in timed relation with the motor shaft and the cam switch 44, at the time it contacts the other of said contacts 40—41, the switch member 76 engages the other enlargement 45—46, thereby opening the control motor circuit and holding the motor circuit open in spite of the closing of the initiating circuit until the thermostat 36 carrying contact 35 has moved over to engage contact 33 to cut out the fuel motor control.

Figures 2, 3, 4, 5:
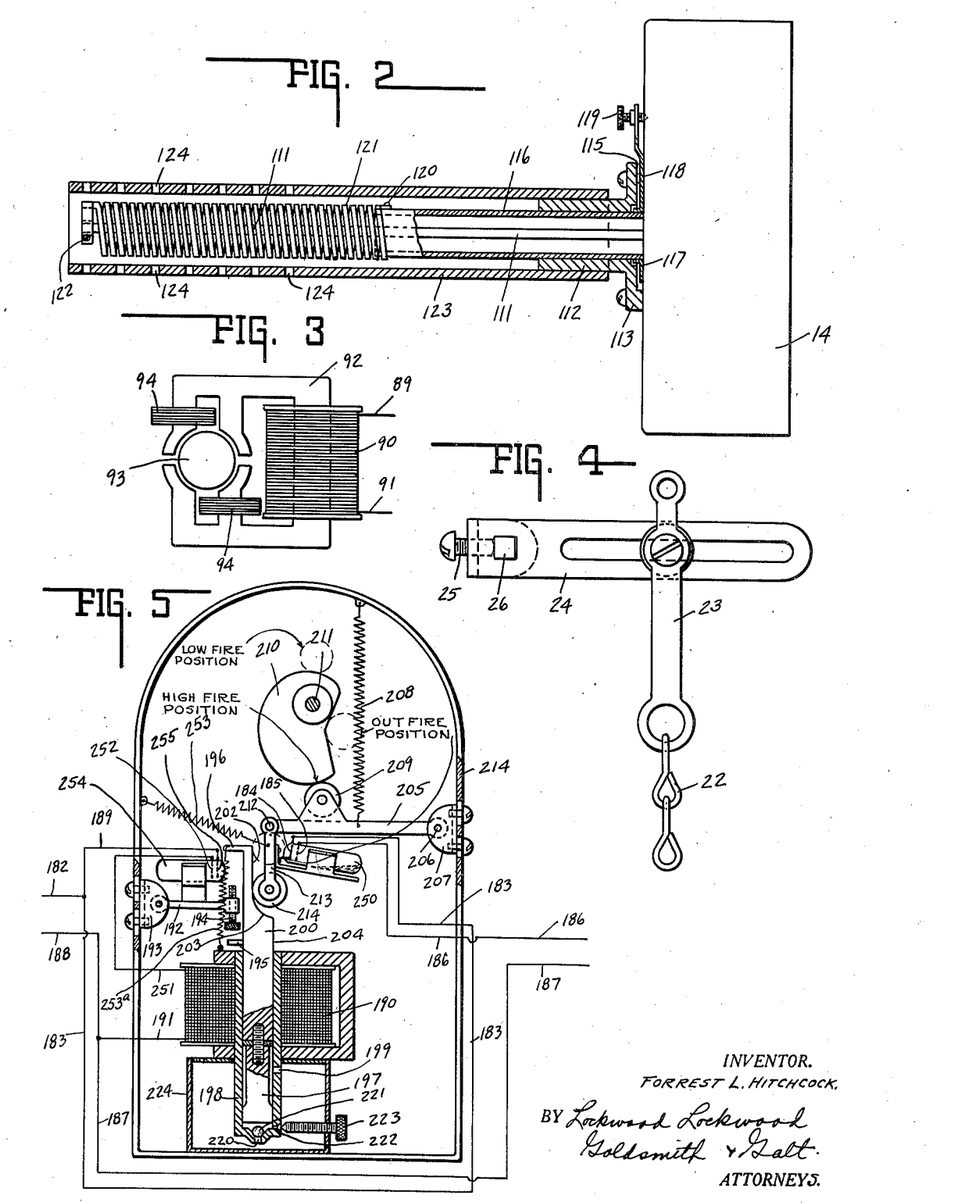
Fig. 2 is a side elevation of the switch control box supporting the thermo-responsive flue gas operable control, the latter being shown in central section.
Fig. 3 is a side elevation of one form of automatic switch moving mechanism and may be considered to be taken in the plane 3—3 of Fig. 1 and in the direction of the arrows.
Fig. 4 is an enlarged site elevational view of the draft damper control arm and may be considered to have been taken in the plane of line 4—4 of Fig. 1 and in the direction of the arrows.
Fig. 5 is a front elevation of a modified form of switch box with the cover removed, certain of the parts being broken away to show the same and other parts in section.

The motor control switch, it will be recalled, has the arcuate switch 48 for contact purposes and the remainder of the portion for open circuit purposes. The contact 48 of this rotary switch is connected by line 81 to the line 54, while the brush 49 is connected by line 82 to a line 83 leading to one terminal 84 of a mercury switch. The other terminal 85 of this mercury switch is connected by line 86 to the fuel feeding motor 38. The other line of the fuel feeding motor is connected to the line 88, in turn, connected to line 55. Thus, when the circuit is closed through the mercury switch contacts 84—85, the fuel supplying motor 38 is energized. Before this action, however, can occur, the mercury switch must be actuated and the operative mechanism therefor includes a power device which in Figs. 1 and 3, is illustrated as a self-starting induction motor 93 while in Fig. 5, the same is illustrated as a solenoid operable device.

A line 89 is connected to one terminal of a coil 90 of the induction motor while the other line 88 is connected to line 91 of the coil. The induction motor includes the laminated core 92, the rotor or armature 93, and the lateral laminated cores 94. The armature 93 drives gear reduction unit enclosed as at 95 and the exposed pinion 96 thereof meshes with a gear 97 in the main switch box. Gear 97 mounts an eccentric pin 98 that is connected by a link 99 to a slide 100 guided as at 101. Slide 100 includes the low portion 102, the elevating portion 103 and the elevated portion 104.

A lever arm 105 is pivotally supported at 106 in an adjustably mounted bearing 107 and is normally constrained as at 108 toward a predetermined position. The lever arm 105 mounts a roller 109 which engages, by reason of the spring 108, a cam 110 mounted on a shaft 111. The lower end of the lever arm 105 pivotally supports at 112 a switch carrier 113 that pivotally supports a roller 114 adapted because of gravity to engage the bar 100 before mentioned. As soon as the control circuit is closed for conditioning the operation of the stoker motor 38, the automatic starting of the induction motor occurs. This causes the slide member 100 to be moved a sufficient amount to elevate roller 114 and with it the switch carrier 113, thereby tilting counterclockwise the mercury switch 84—85 and causing the mercury to short circuit the two terminals 84 and 85. When this occurs, the motor 38 derives power from the main lines 57 and the fuel feeding occurs. In Fig. 1, switch 199 is shown in open circuit position and carrier 113 is similarly positioned.

As soon as the predetermined time cycle elapses by reason of the continued rotation of the induction motor, the switch 84—85 is permitted to tilt clockwise by gravity, by the movement to the left of the slide 100 whereupon the stoker motor circuit is opened. This operation is repeated as long as the thermostat calls for heat. In other words, the stoker motor may be intermittently energized during the period that the thermostat calls for heat. The actual duration of the closed circuit period for the motor 38 is determinable by a cam 110 carried by shaft 111. Reference will now be had to Fig. 2 wherein the construction of the cam operating structure is illustrated.

The cam switch housing 14 has mounted upon its back a hub structure having the tubular portion 112 and the plate portion 113, the latter being slotted as at 115. Rotatably mounted therein is a tube 116 which, at its end nearest the housing 14, mounts a plate 117 from which extends an arm 118 that projects through the slot 115. Slot 115 is of appreciable size and arcuate so that the arm 118 can be manipulated for adjustment of the tube 116.

A set screw 119 carried by the arm is adapted to frictionally engage the casing 14 of the main switch and anchor the tube 116 in the adjusted position. The other end of the tube 116 as at 120, is rigidly secured to a bi-metallic coil strip thermostat 121, the other end of which is rigidly secured as at 122 to the extended prolongation of the shaft 111. For protection purposes, the cover tube 123 may be employed and the same may be apertured as at 124 for ash deposit discharge. The tube 123 and thermostat included therein is positioned in the smoke pipe 13 as indicated at 114, in the lower left hand portion of Fig. 1. As the condition of the fire changes, the temperature of the draft and exhaust gases through the fire and through the smoke pipe changes accordingly. Thus, a high fire will cause an extension of the thermostat which will cause rotation of the shaft 111 and thereby cause rotation of the cam 110. A low fire will cause a contraction of the thermostat and thereby cause a reverse rotation of the cam 110. In other words, for a low fire, a considerable shorter period of motor operation will be obtained because the cam 110 cooperates with the roller 109 on lever 105 to decrease the period of closed circuit condition obtained through the mercury switch 84—85 and vice versa for a high fire condition. In addition to this thermostatic control of the stoker or fuel motor operation, additional controls are provided and these are included in the switch 14 and are shown in the middle portion of the left hand side of Fig. 1, parts of the same having been heretofore described.

Rigid with the shaft 111 is a dial 125. An arm 126 having the indicating portion 131 is rigidly but adjustably mounted on the shaft 111 as at 128 and said arm 126 supports the mercury tube switch 129 which at one end includes the terminals 71 and 72, before mentioned. A similar arm 130 having the indicator 127 is adjustably secured to the shaft 111 as at 132 and supports a mercury switch 133, the latter including at one end the terminals 64 and 65, before mentioned. Mercury switch 129 at its opposite end includes the terminals 134 and 135, terminal 135 being connected by line 136 to the line 63 and line 62 as shown in Fig. 1. Terminal 134 of mercury switch 129 is connected by line 137 to line 60 and line 61 as illustrated.

Mercury switch 133 includes the terminals 138 and 139, terminal 138 being connected by line 140 to line 60 and line 59. Terminal 139 is connected by line 141 to lines 73 and 74 as shown. These constitute the high and low fire control switches and the position of shaft 111 as before stated serves to control the position of these mercury switches 129 and 133 which move simultaneously.

It will be noted that the circuit through the mercury switch 129 (contacts 71 and 72) is normally closed while the circuit through the contacts 134 and 135 is normally opened. Similarly, the circuit through the mercury switch 133 (contacts 64 and 65) is normally closed and through the contacts 138 and 139 is normally opened.

In order words, when these circuits are normally closed through the switches but which are interrupted or opened when a high or low fire condition is obtained in a furnace and then the circuits are made through the other switches. In other words, if the shaft 111 rotates counterclockwise, the circuit through contacts 71 and 72 remain closed, the circuit through the contacts 64 and 65 is opened and the circuit through the contacts 138 and 139 is closed. For a reverse thermal condition when the shaft 111 rotates clockwise, the circuit remains closed through the contacts 64 and 65, the circuit is opened through the contacts 71 and 72 and the circuit is closed through the contacts 134 and 135. Thus, high and low selective control is obtained through the switch arrangement, thereby insuring predetermined motor operation for feeding just the right amount of fuel that the fire can successfully accommodate, ignite and burn. This prevents excessive heating of the fire or starving of the fire by the addition of too much fuel or too little fuel, respectively. The operation and construction of cam 110 is such as to insure the gradual addition of a slight surplus of fuel to insure the gradual building up of the fire.

In Fig. 5, there is illustrated a modified form of main control switch. In said figure, 214 indicates the housing, 210 the cam, 211 the shaft mounting the cam and which is oscillated in response to thermal changes in the smoke pipe. Cam 211 engages the roller 209 carried by the lever arm 205 pivoted at 206 in the support 207 adjustably mounted as shown upon the casing. The lever arm 205 is pivotally connected at 212 to a link or carrier 213 which mounts the fuel supplying motor mercury control switch indicated by the numeral 250 and having the terminals 184 and 185. These terminals correspond to the terminals 84 and 85 in the motor control switch shown in Fig. 1. The spring 208 normally constrains the roller 209 in contact with the cam. An additional spring 253 may take the place of gravity employed as in the first mentioned switch arrangement and gravity and/or spring 253 normally constrains the arm 213 carrying the roller 214 into contact with the relieved portion 202 of the reciprocating member or non magnetic core 200 having the elevated portion 204 and the intermediate portion 203. Means for reciprocating this mechanism is of a different type than that shown in Figs. 1 and 3. Herein the reciprocating member 200 is shown as attached to the magnetic core 197 of a solenoid associated with which is a coil 190. Mercury switch contact 185 is connected to line 186, the same corresponding to line 86 connecting to the stoker motor 38 in Fig. 1. Mercury switch contact 184 corresponding to this contact 84 is connected by line 183 corresponding to line 83 in Fig. 1 to a supply line 182.

Line 191 from supply line 188 connects to one terminal of the coil 190. The other terminal of the coil is connected by line 251 to a mercury switch contact 252 of the mercury switch 254. The other terminal 255 thereof is connected by line 189 to a supply line 182. Thus, the coil 190 is directly across the lines 182 and 188, these corresponding to lines 82 and 88 leading from the motor control switch in Fig. 1. The line 183 as before mentioned, is connected to line 182 at one end and at its opposite end to the switch contact 184 of mercury switch 250. The line 188, in addition to being connected to the coil 190 through line 191, is connected to the line 187 that leads directly to the fuel feeding motor 38. In this form of the invention, it will be apparent that there is interposed from the line 189 an additional switch 254. This is a "make and break" switch which is normally closed, but which, when actuated, opens the circuit at the high point of the travel of the member 200, the member 200 being returned by gravity or spring 253a and the rate of returning being controlled. This mechanism corresponds to the induction motor type shown in Figs. 1 and 3. In Fig. 5, a pivoted arm 192 is carried by a support 193 adjustably mounted upon the frame 214. The arm 193, in addition to supporting the mercury switch 254, adjustably supports a stop or actuating member 194.

In this form of the invention, the reciprocating member 200 includes lateral projections 195 and 196. When the member 200 is in its lowest position, there being then no energization in the coil 190, the lines 182 and 188 being opened through the motor control switch, the mercury switch 254 is tilted clockwise so that the circuit is normally closed through the contacts 252 and 255. Thus, the solenoid and its circuit is always conditioned for operation. When the circuit is closed through the lines 182 and 188 by the control motor switch, the solenoid is energized and the core 200 is elevated, which carries upwardly the arm 195 and serves to open the solenoid circuit when the desired amount of travel has occurred. When the circuit is broken by the engagement of the member 194 by the arm or lateral projection 195, the coil 190 is deenergized. Gravity operating on the core serves to return the same to the initial or lowered position. In this return movement, the arm 196 may engage the top of the member 194 for repositioning the switch 254 in the closed circuit position.

The lower end of the core terminates in a magnetic piston 197 that is slidably mounted in a cylinder 198 having the relief port 199. The lower end of the cylinder includes an intake opening 220 controlled by a ball check 221. It also includes a discharge opening 222 with which is associated an adjustable regulating valve 223, the latter being supported by a reservoir 224. When the solenoid is energized, fluid, which may be oil or may be air, in the reservoir 224 rushes into the cylinder 198, passes the check valve 221 through the port 220. The back pressure in the cylinder behind the piston 197 is relieved through port 199. Upon de-energization of the solenoid 190, the weight of the core tends to return the piston and in so doing, the fluid trapped in the cylinder 198 initially closes the check 221 and the rate of return is regulated by the rate of discharge of the fluid supplied to cylinder 198 and discharged through the regulated discharge opening 222. In this way, the time cycle of the reciprocation of the member 220 can be regulated and in this respect this form of the invention has greater flexibility or universal adaptability than the induction motor type motive power for reciprocating the member 100 shown in Fig. 1.

It will also be understood that the high and low fire control switches shown in Fig. 1 as mounted upon the shaft 111 can also be incorporated in and included as a part of the switch mechanism shown in Fig. 5 and would be mounted upon shaft 211 in exactly the same manner. The wiring diagram of the system including the switch figure shown in Fig. 5 then would be identical with that shown in Fig. 1 with the addition of the solenoid controlling switch 254 included in the line to the solenoid, whereas the induction motor in Fig. 1 is connected directly across the line without any switch for breaking its circuit other than the switch in the motor control switch device, which switch is also utilized with the form of switch device shown in Fig. 5 so that the motor control switch for controlling the power supply to the mechanism for the reciprocating member 200 is in series with the switch 254 shown in Fig. 5 to open the solenoid circuit.

Other forms of mechanisms may be employed to transfer the motion of the shaft 111 or 211 to the roller 109 or 209, respectively, or their equivalents as will be well understood by those skilled in machine design and such mechanisms are to be considered within the scope of the invention, reference being had to the appended claims.

*Stoker mechanism*

Reference will now be had to Figs. 1, and 6 to 8, inclusive, for a description to the stoker applied to the furnace construction, and said stoker is arranged to automatically supply pea coke or the like and to automatically remove the ashes from the furnace and discharge them into an ash receptacle and as shown in Fig. 1, the fuel storage and the ash storage are combined in a single unit.

Figure 6:
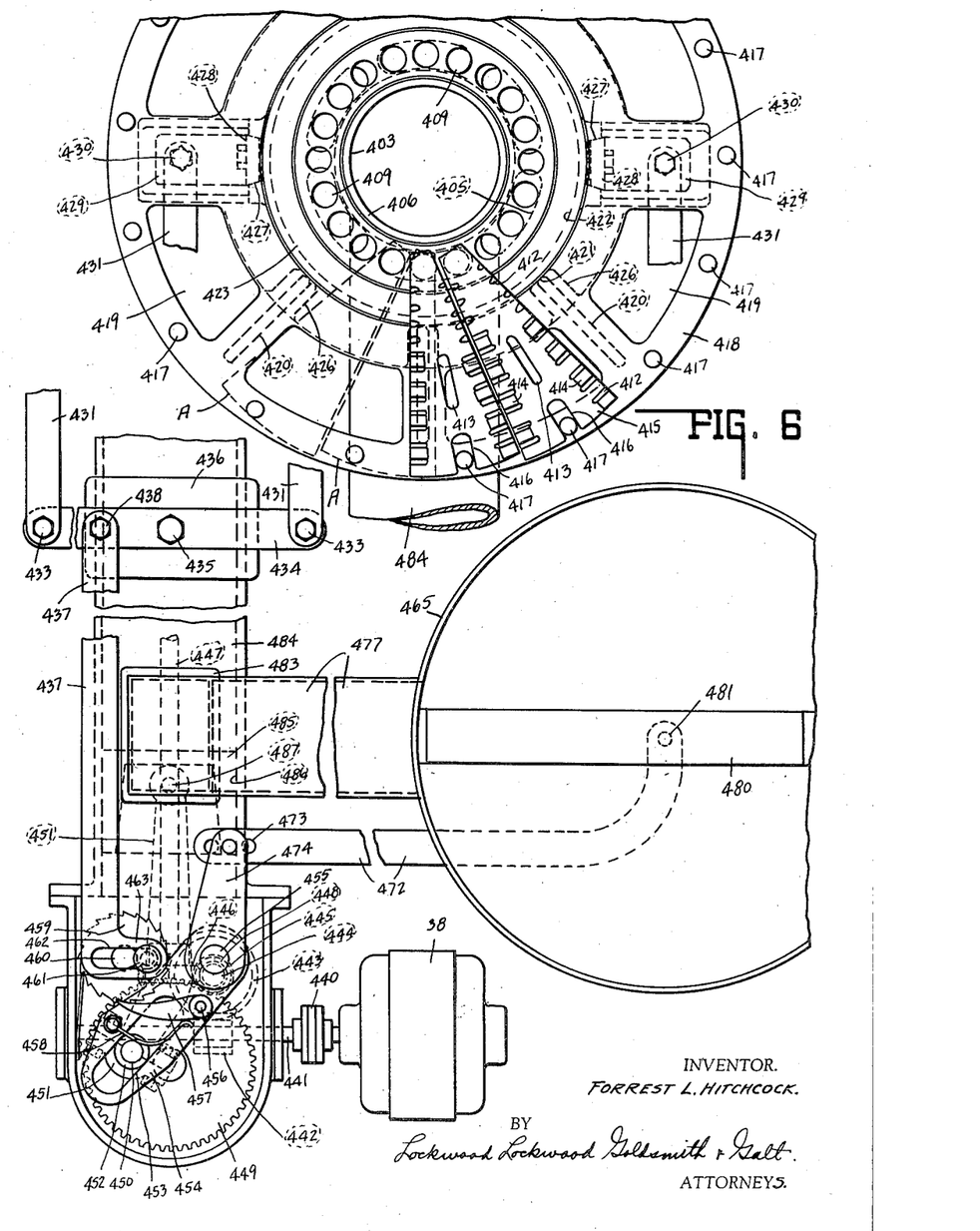
Fig. 6 is a top plan view of the stoker itself, certain cover parts being omitted, the figure being arranged in two parts, one offset from the other.

In the lower part of Fig. 1, the stoker mechanism is shown associated with the furnace 10. The details of the stoker mechanism are shown most clearly in Figs. 6 to 9. Positioned in the ash pit of the furnace and substantially closing the fire bowl of the furnace and replacing the usual grates is a grate structure. It is supported by a main casting 400 and the height thereof is adjusted by the adjustable support 401 that bears on the bottom of the furnace or ash pit floor. The casting 400 terminates in an elbow 401a having the bell or flange 402 adapted to nestingly receive the lower end of a sleeve 403. The sleeve 403 includes near its upper end a laterally projecting flange or plate 404 that is suitably apertured as at 405. These apertures are of arcuate formation as shown in Fig. 6. The sleeve extends upwardly beyond the plate as at 406, and seated thereon and retained in position by the portion 406 is a grate bar supporting ring in the form of a sleeve 407 and a lateral flange or plate 408 apertured as at 409. Each aperture 409 receives a circular downwardly directed extension 410 of a grate bar.

Each grate bar is arch-shaped (see Fig. 7) and is segmental in outline (see Fig. 6). The grate bar is indicated by the numeral 411 and includes along each of its radial sides the notches 412 and extending through and in radial alignment with the slots 413. The grate bars upon their upper curved surface include projecting portions 414, best shown in Fig. 7. The projections 414 at each side of each segment are offset with respect to the projections upon the adjacent segment. This is clearly shown in Fig. 6, and in the movement of the segments as hereinafter set forth, these projections have a shearing action relative to each other. The outer periphery of the grate bar, which is shown arcuate and which is at its lower end indicated by the numeral 415, is provided with a radial notch 416, (see Fig. 6) adapted to receive or nest a pin or abutment 417 carried by an oscillating ring 418. Fuel is supplied through the elbow 401a and is forced upwardly into the central opening formed in the grate. By the peripheral arrangement of the grate bars, the fuel moves upwardly and gradually is forced outwardly and falls by gravity toward the outside of the grate. Air for combustion passes upwardly through the openings 419 in the oscillating ring structure 418, as well as through the openings 405 and thence passes upwardly through the openings 412 and through the openings 413 in the grate bars to the fuel.

The rate of fuel feeding is such that by the time the fuel has moved from the central opening to the ring 418, it is in the form of an ash. By means hereinafter set forth, all of the peripherally arranged grate bars are simultaneously oscillated to and fro in the fuel feeding movement. In this movement, there is a radial shearing action obtained between adjacent grate bars and upon the fuel. This keeps the fuel broken up and prevents mass coking and also reduces any clinkers that may tend to form. One extreme oscillation position is shown by the full lines in Fig. 6. Another extreme oscillation position and in the opposite direction is shown by the dotted lines A—A in Fig. 6. For clearness, only two of the grate segments are illustrated in the first position and two others are diagrammatically indicated in the other position.

Figure 7:
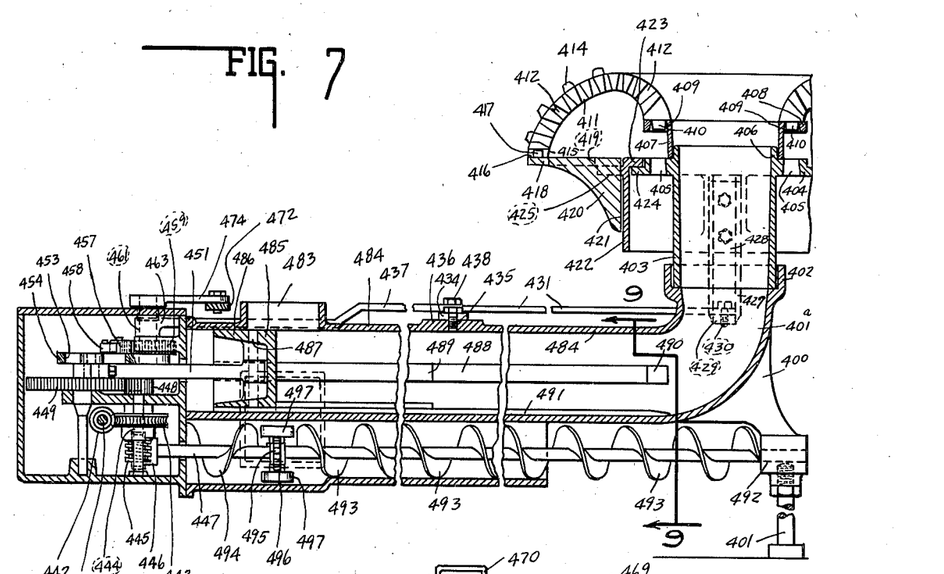
Fig. 7 is a longitudinal sectional view through the grate, fuel supplying conduit and ash removing mechanism, together with the power provided therefor.

Small ash, which falls through the grates near the central tube for fuel supply instead of collecting around the member 407, passes through the openings 405 and thence downwardly and collects upon the floor of the ash pit. This ash is usually in the form of a very fine powder. The larger ash discharges through the openings 419 and collects upon the floor of the furnace. The plate 418 includes a plurality of reenforcing ribs 420 that are arranged in spaced relation about the periphery of the ring and depend therefrom and have a vertical face 421 that lies adjacent the tube 422. The tube 422 has an inturned flange at its upper end 423 that rides upon the projecting portion 424 of the plate 404 and lies flush therewith as shown in Fig. 7.

The tube 422 includes a flange 425 that lies below the level of the flange 423 and is directed outwardly, whereas the flange 423 is directed inwardly. The same constitutes a support for the ring 418. The flange 425 as shown clearly in Fig. 6, is radially slotted as at 426 and the webbing 420, before mentioned, extends through and is seated in said slots so that there is an interlocking connection between the ring 418 and the tube 422.

The flange 425 of the tube 422 includes a wedge-shaped tapered slot 427. A wedge-shaped bar has one end seated in this wedge-shaped slot 427 and the vertical depending portion 428 of said bar terminates at its lower end in an outwardly projecting arm portion 429 and pivotally mounted thereon as at 430 is a link 431. The two substantially parallel links 431 lie a considerable distance (see Fig. 7) below the grate structure and are pivotally connected as at 433 to a rocking bar 434. The rocking bar 434 is pivotally supported as at 435 upon the fuel feeding tube portion 436. A link 437 is pivotally connected to the rocking bar 434 as at 438. The link 437 is reciprocated to and fro longitudinally of the axis of the fuel supplying tube and in its reciprocation it alternately turns the ring 418 in one direction and then in the opposite direction. This causes the grate bars to move from the full line position in Fig. 6 to dotted line position A—A therein and return.

In Fig. 6, it will be noted that while the two grate segments are shown by full lines in one extreme position, the cross bar 434 is shown in the neutral position representing an intermediate position from that shown by the full lines of the grate segments therein and the dotted lines A—A of the grate segments in the other extreme position.

*Power mechanism*

The motor 38 is connected by the coupling 440 to a shaft 441 and mounted thereon is a worm 442 that meshes with a worm wheel 443 on shaft 444. The shaft 444 mounts a worm 445 that meshes with a worm wheel 446 carried by the ash removing conveyor shaft 447. Reference will be had later to the construction and operation of the ash removing mechanism.

The shaft 444 mounts a pinion 448 meshing with a gear 449 that carries an eccentric 450 that reciprocates a connecting rod 451 connected to the fuel feeding mechanism in the form of a ram or plunger which will be set forth more in detail hereinafter.

The pin 450, upon its free end, mounts a roller 452 which is positioned in the elongated slot 453 in the arm 454 that is pivotally supported as at 455. The arm 454 pivotally supports as at 456, a pawl 457 constrained by spring 458 into engagement with a ratchet wheel 459.

Ratchet wheel 459 is rotatably mounted at 460 and carries an eccentric pin 461 that rides in an elongated slot 462 of an angular extension 463 of the link 437. In the rotation of the motor and all of the parts, the ratchet has uni-directional rotation and this causes reciprocation of the link 437 for oscillating the grate segments by rocking of the arm 434.

Reference will now be had to Figs. 1, 6, 7 and 8. In Fig. 1, there is illustrated a container 465 which, near its lower end, includes an opening closed by a suitable door structure 466 and intermediate the ends is a partition 467. The partition 467 divides the receptacle 465 into a fuel hopper and an ash receiver. The fuel hopper, near its upper end, includes a screen 468 (see Fig. 8) that prevents the discharge of fuel or other material of a size greater than the mesh of said screen into the hopper and, therefore, prevents subsequent clogging of the fuel feeding mechanism. A suitable cover 469 having a handle 470 may be provided. The container also is apertured (see Figs. 1 and 8) as at 471 and an arm 472 (see Fig. 6 particularly) is adjustably connected at its lower end (see Fig. 1) as at 473 (see Fig. 6) to a lever arm 474 carried by shaft 455 that mounts the arm 454. Thus, the member 472 is reciprocated to and fro through the opening 471 of the casing.

In the fuel containing portion of the hopper, the lower portion thereof is flared inwardly as at 475 from the back and from the two opposite sides so that gravity discharge of the fuel toward the opening 476 is obtained.

Figure 8:
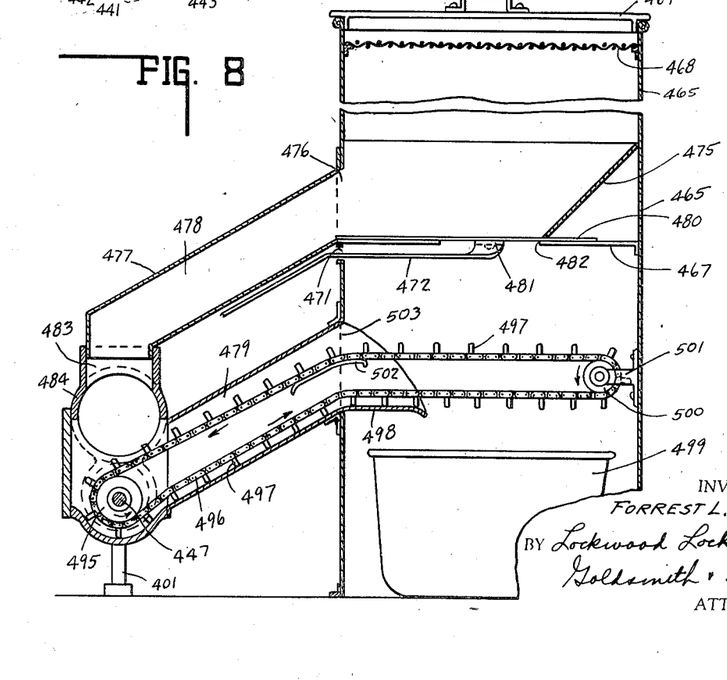
Fig. 8 is a central sectional view through the coal reservoir, ash reservoir, portions of the fuel conduit and ash conduit and associated mechanism.
Figure 9:
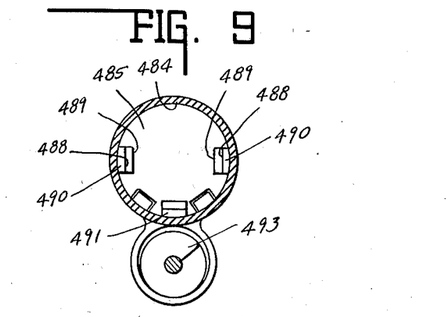
Fig. 9 is a transverse section of the stoker mechanism taken in the plane 9—9 in Fig. 7 and in the direction of the arrows.

The combination hood and chute is indicated generally by the numeral 477 (see Fig. 1) and as shown in Fig. 8 includes an upper chute portion 478 and a lower passage portion 479. The lower part of the hopper includes a sliding plate 480 and pivotally connected thereto as at 481 is the offset portion or end of arm 472. This portion is operatively associated with the reciprocating plate 480 and the reciprocation of the plate is permitted since the partition 467 includes the opening 482 for that purpose. This includes the gradual forward feeding of the fuel at the bottom of the hopper toward the discharge opening 476 where it falls by gravity through the chute 478 into the mouth 483 of the fuel supplying conduit 484.

Mounted in the conduit 484 is a plunger or ram 485 having a relatively elongated skirt 486 and connected to the connecting rod 451 as at 487. Extending forwardly from the plunger and at each side thereof (see Figs. 7 and 9) are a pair of arms 488, the same being offset laterally and inwardly as at 489 and terminating in an inwardly tapered edge 490.

Extending from the bottom of the plunger is a similar member 491 and these members 488 and 491 assist in the forward movement of the fuel and prevent clogging of the fuel in the conduit 484, which terminates in the elbow 401a (see Fig. 7). When the motor 38 (see Figs. 1 and 6) is energized, the mechanism is arranged to reciprocate the plunger 485 and thus feed forwardly the fuel supplied to the conduit 484 through the chute 478.

As before mentioned, positioned beneath the fuel supplying conduit 484 is a shaft 447 that is mounted at its remote end in a bearing 492. Said shaft carries a worm or spiral 493 that ends in the vertical plane of the chute receiving mouth 483. The shaft between said mouth and forwardly thereof has a reverse spiral 494 that cooperates with the spiral 493 so that ashes drawn from the ash pit by the spiral or screw 493 are caused to stop their horizontal movement at the junction of these two spirals and the shaft. The shaft 447 mounts a sprocket 495 and operatively associated therewith is a chain conveyor 496. The chain conveyor 496 has projecting outwardly therefrom the blades 497, and these blades serve to convey the ash brought to the junction of the two spirals or screws upwardly through the chute portion 479 by conveying them along the bottom portion of said chute.

The ash portion of the container 465 includes a discharge platform 498 that constitutes a continuation of the bottom portion of the chute 479. This discharge portion overhangs an ash receiving basket 499. The conveyor is associated with a sprocket 500 mounted in the bracket 501 carried by the container 465. To insure parallelism in the upper and lower runs of the conveyor, a support and guide 502 is provided which lies above the portion 498. The container includes the opening 503 with which the chute 479 registers. With this mechanism, the ashes are withdrawn from the ash pit by the the screw or spiral and then are conveyed upwardly into the container 465 and discharged by the chain conveyor into the basket 499. The door 466 in the lower portion of the container 465 may be opened when desired and the basket removed for ash disposal.

It will be noted that with the foregoing device, no additional ash receiving mechanism is required below the grate. In other words, if the ashes have collected in a sufficient amount in the bottom of the ash pit, the screw or spiral serves to remove the excess ashes to the basket. In other words, the ashes that are not removed serve to form a hopper by which additional ashes are discharged to the spiral.

Figure 10:
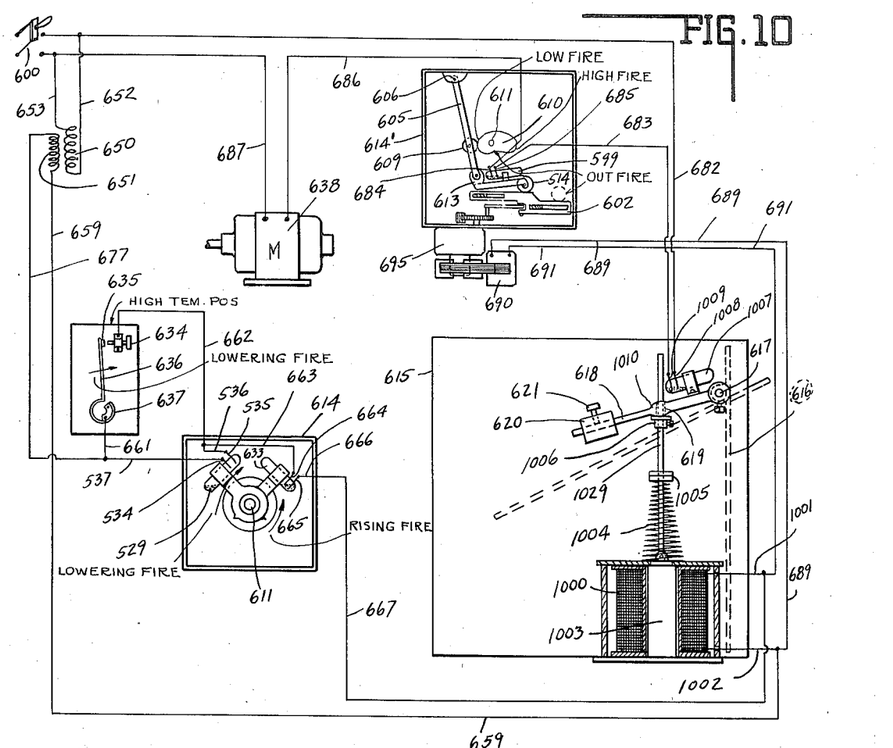
Fig. 10 is a diagrammatic view of a modified form of the invention, such modification being of the so-called single-circuit type and the damper control being electromagnetically operable.

In Fig. 10 of the drawings, there is illustrated the casing 614' of the control motor switch and the casing includes the lever arm 605 pivoted at 606 and supporting the roller 609 engageable by cam 610 carried by the thermally rotatable shaft 611. A carrier member 613 includes a roller 614 that rides upon the member 602 that is reciprocated through the electric power device which, in the present form, is shown as of the induction motor type, the same being indicated by the numeral 695, and the energization being furnished by the coil 690 supplied by lines 691 and 689. The switch structure shown in Fig. 5 may be substituted therefor.

The main switch 600 is adapted to connect line 682 to a terminal 1008 of a mercury switch 1007. The other terminal 1009 is connected by a line 683 to a terminal 685 of a mercury switch 599 carried by the arm 613. The other terminal 684 of said switch is connected by line 686 to the motor 638. The other terminal of the motor is connected by line 687 to the main power line through the switch 600.

As shown in Fig. 10, the check or by-pass draft valve structure is in closed position and the additional mercury switch 1007 is arranged in closed circuit position and the switch 599 is also arranged in closed circuit position so that the motor 638 is energized. This is the fuel supplying motor. This electro-magnetic type of check valve control may be readily substituted in Fig. 1 for that shown therein, since it is of the mechanically actuated type.

The primary 650 of the transformer is connected by line 652 to the line 682 and is connected to line 687 by line 653. The primary 650 is, therefore, directly across the line. When the switch 600 is closed, the secondary 651 is conditioned to supply current by line 677 to the thermostat 637, the same being connected to the line 677 by the line 661. The thermostat 637 carries the member 636 and contacts at 635 adapted to engage the adjustable contact 634 connected by line 662 to line 663, which is connected to the terminal 664 of the mercury switch 633, the other terminal 665 of which is connected by line 666 to a line 667 in turn, connected by line 691 to the induction motor 690. The return line 689 from the induction motor 690 is connected to line 659 and the circuit is closed through the secondary.

In other words, under normal conditions when the thermostat is closed calling for heat, the circuit is completed through the mercury switch 633 and to the induction motor, causing energization of the induction motor and movement of the slide 602 to tilt the mercury switch 599 to close the circuit to the main motor 638, this circuit being closed, however, only because the switch 1007 has been closed. That is, the check is closed when the thermostat calls for heat.

This closing of the check valve 616 is accomplished by the solenoid 1000 connected by line 1001 to the line 666 and the return 1002 is connected to the return line 659. Energization of the solenoid serves to pull downwardly the core 1003 and the stem 1029 thereof carries an adjustable plate 1005 that bears upon a spring 1004 that normally tends to return the core in elevated position. The stem 1029 carries an adjustable plate 1006 that bears upon an abutment 1010 with the lever arm 618 secured to the shaft 617 that supports the check damper 616 in the smoke pipe auxiliary inlet 615. The arm 618 upon its extended portion, adjustably supports as at 621, a weight 620.

Upon the thermostat calling for heat, the solenoid is energized and in opposition to spring 1004, the check 616 is closed, thereby conditioning the draft for firing. The actual fuel supplied to the fire and the duration thereof is determinable by the thermally controlled cam 610 on shaft 611 engaging the cam roller 609. The initial energization of the solenoid 1000 conditions switch 1007 to closed circuit position and this is held closed during all the period that the thermostat is calling for heat, even though the motor circuit through the switch 599 be not closed. This is for the purpose of opening the stoker motor circuit immediately upon opening of the thermostat switch or other control switches, since switch 599 may at this time be in closed circuit position.

It is to be noted that the shape of cams 110, 210 and 610 may be varied from that shown to any desired conformation. The general operation thereof, however, remains the same.

Under abnormal high fire conditions, the shaft 611 is tilted counter-clockwise so that the switch 633 is in open circuit position. When thus positioned, the fuel supplying motor 638 will not be energized and neither will the induction motor and neither will the solenoid. This is the abnormal high fire condition. For low fire, the shaft 611 is rotated clockwise and in so doing, the cam 610 will secure actuation of the arm 613 by slide 602 and, therefore, secure a shorter interval of actual motor operation. The current under this type of operation will not flow through the thermostat when it does not call for heat, and will follow the lines 536 and 537 of the switch 529, then through the switch 633 and the circuit will be closed through the solenoid 1000. In other words, the thermostat is short circuited. Under outfire arrangement conditions, even though the thermostat calls for fuel, the fuel motor will not supply fuel because cam 610 is not positioned to position roller 514 inoperative to slide 602 to secure tilting of arm 613 and closing of motor control switch 599.

The foregoing detailed description of the several illustrated forms of the invention is merely for the purpose of illustration and is not to be considered of a limiting character. The various modifications thereof, which will readily suggest themselves to those skilled in this art are all considered to be within the broad purview of this invention, reference being had to the appended claims.

The invention claimed is:

1. In a furnace control system, the combination of a fuel feeding motor, a room temperature responsive switch, a self starting induction motor, a motor operable switch responsive to the room temperature switch for controlling the induction motor, and a fire condition responsive control switch operatively associated with the self-starting induction motor and controlling the fuel feeding motor.

2. In a furnace control system, the combination of a fuel feeding motor, a room temperature responsive switch arranged to attempt to initiate motor operation, a self starting induction motor, a motor operable switch responsive to the room temperature switch for controlling the induction motor, and a fire condition responsive control switch for controlling the fuel feeding motor.

3. In a furnace stoker control system having a fuel rationing feature, an electrically operated stoker, a stoker operation timing device, a room thermostat normally in control of said timing device, and means associated with said device and responsive to fire conditions in the furnace varying the period of operation of said device whereby less fuel is fed into the furnace by the stoker under low fire conditions and more fuel is fed therein under high fire conditions, the variations in fuel supply being independent of the demand of said thermostat.

4. In a furnace stoker control system having a fuel rationing feature, an electrically operated stoker, a stoker operation timing device, a room thermostat normally in control of said timing device, and means associated with said device and responsive to fire conditions in the furnace varying the period of operation of said device whereby less fuel is fed into the furnace by the stoker under low fire conditions and more fuel is fed therein under high fire conditions, the variations in fuel supply being independent of the demand of said thermostat, said stoker operation timing device normally causing the stoker to operate intermittently in "off" and "on" cycles, said means varying the "on" cycle, and means responsive to a furnace condition of low fire causing said device to operate independently of said thermostat.

5. In a furnace stoker control system having a fuel rationing feature, an electrically operated stoker, a stoker operation timing device, a room thermostat normally in control of said timing device, and means associated with said device and responsive to fire conditions in the furnace varying the period of operation of said device whereby less fuel is fed into the furnace by the stoker under low fire conditions and more fuel is fed therein under high fire conditions, the variations in fuel supply being independent of the demand of said thermostat, and means responsive to a furnace condition of high fire rendering said means inoperative independently of said thermostat.

6. In a furnace stoker control system, a regulator for rationing the fuel supplied a burner by the stoker in proportion to the rate of burning comprising a moving member operating in timed sequence irrespective of fire conditions at said burner, an abutment on the moving member, a stoker control tiltable switch member, an arm connecting with the switch member adapted to be shifted over said abutment, and means responsive to fire conditions at said burner for shifting said arm, said arm being also rockably mounted and so formed to have movement of said abutment normally cause rocking of the arm to tilt said switch member, the degree of shifting of the arm in relation to said abutment determining the length of time required by the abutment to rock the arm.

7. In a furnace stoker control system, a regulator for rationing the fuel supplied a burner by the stoker in proportion to the rate of burning comprising a moving member operating in timed sequence irrespective of fire conditions at said burner, an abutment on the moving member, a stoker control tiltable switch member, an arm connecting with the switch member adapted to be shifted over said abutment, and means responsive to fire conditions at said burner for shifting said arm, said arm being also rockably mounted and so formed to have movement of said abutment normally cause rocking of the arm to tilt said switch member, the degree of shifting of the arm in relation to said abutment determining the length of time acquired by the abutment to rock the arm, said arm and abutment being so relatively formed as to have said switch member in an open position when said fire responsive means has shifted said arm upon an out-fire condition.

8. In a furnace stoker control system, a regulator for rationing the fuel supplied a burner by the stoker in proportion to the rate of burning comprising a moving member operating in timed sequence irrespective of fire conditions at said burner, an abutment on the moving member, a stoker control tiltable switch member, an arm connecting with the switch member adapted to be shifted over said abutment, and means responsive to fire conditions at said burner for shifting said arm, said arm being also rockably mounted and so formed to have movement of said abutment normally cause rocking of the arm to tilt said switch member, the degree of shifting of the arm in relation to said abutment determining the length of time required by the abutment to rock the arm, and a room thermostat switch normally controlling operation of said moving member.

9. In a furnace stoker control system, a regulator for rationing the fuel supplied a burner by the stoker in proportion to the rate of burning comprising a moving member operating in timed sequence irrespective of fire conditions at said burner, an abutment on the moving member, a stoker control tiltable switch member, an arm connecting with the switch member adapted to be shifted over said abutment, and means responsive to fire conditions at said burner for shifting said arm, said arm being also rockably mounted and so formed to have movement of said abutment normally cause rocking of the arm to tilt said switch member, the degree of shifting of the arm in relation to said abutment determining the length of time required by the abutment to rock the arm, and a room thermostat switch normally controlling operation of said moving member, and a low fire switch member actuated by said fire responsive means for shunting said thermostat switch under low fire conditions to permit operation then of said moving member irrespective of said thermostat.

10. In a furnace stoker control system, a regulator for rationing the fuel supplied a burner by the stoker in proportion to the rate of burning comprising a moving member operating in timed sequence irrespective of fire conditions at said burner, an abutment on the moving member, a stoker control tiltable switch member, an arm connecting with the switch member adapted to be shifted over said abutment, and means responsive to fire conditions at said burner for shifting said arm, said arm being also rockably mounted and so formed to have movement of said abutment normally cause rocking of the arm to tilt said switch member, the degree of shifting of the arm in relation to said abutment determining the length of time required by the abutment to rock the arm, and a room thermostat switch normally controlling operation of said moving member, and a low fire switch member actuated by said fire responsive means for shunting said thermostat switch under low fire conditions to permit operation then of said moving member irrespective of said thermostat, and a high fire switch member actuated by said fire responsive means in series with said thermostat switch.

11. A device for controlling a burner supplied fuel by a stoker including the combination of a thermostat in the spaces heated and a regulator actuated by variations of fire conditions at the burner normally under control of the thermostat, said regulator having means for varying the amount of fuel fed to the burner on each operation of the stoker directly in proportion to said fire condition, less fuel being fed under low fire conditions and increasing amounts of fuel fed as the rate of combustion at the burner increases.

FORREST L. HITCHCOCK.